J. P. Evans,
Steam-Boiler Fire-Box.
No. 1,447. Reissued Apr. 7, 1863.
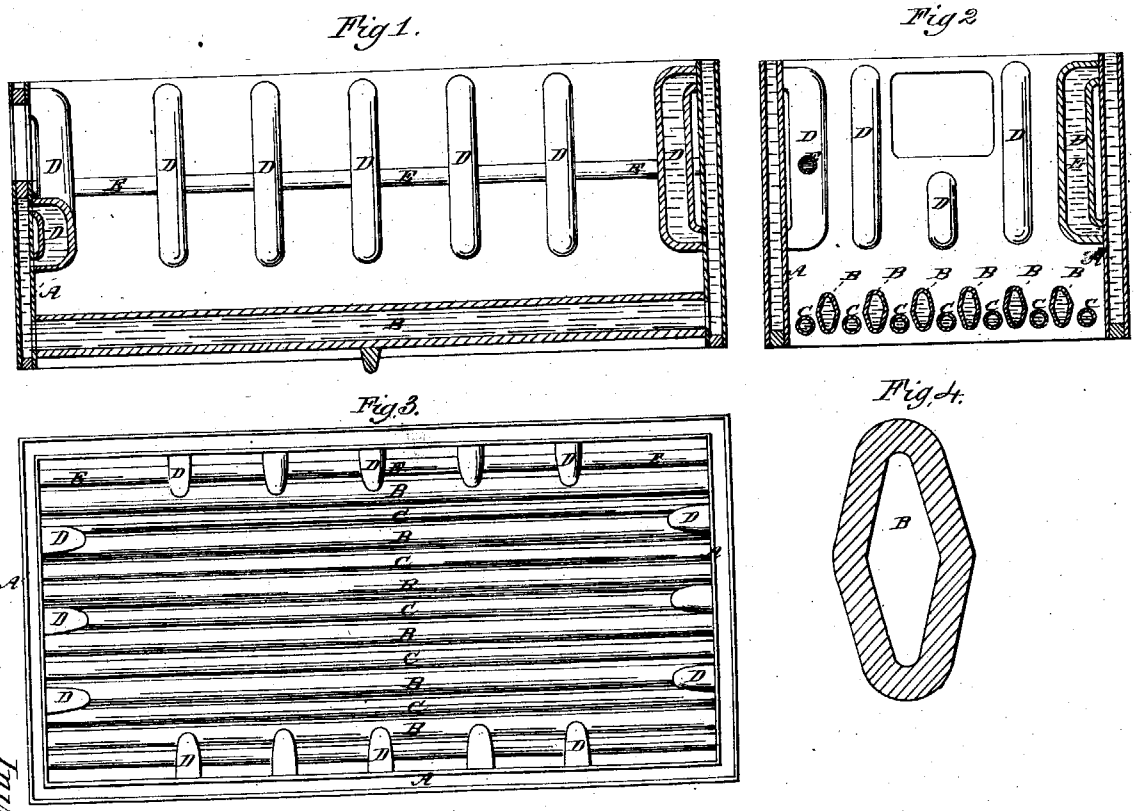
Witnesses.
J. W. Coombs.
G. W. Reed
Inventor.
J. P. Evans
per Munn & Co.
attys.
N. PETERS, PHOTO-LITHOGRAPHER, WASHINGTON, D. C.

UNITED STATES PATENT OFFICE.

JOSEPH P. EVANS, OF HAZLETON, PENNSYLVANIA.

IMPROVEMENT IN FURNACES OF STEAM-BOILERS.

Specification forming part of Letters Patent No. 34,823, dated April 1, 1862; Reissue No. 1,447, dated April 7, 1863.

*To all whom it may concern:*

Be it known that I, JOSEPH P. EVANS, of Hazleton, in the county of Luzerne and State of Pennsylvania, have invented certain new and useful Improvements in Furnaces for Steam-Boilers; and I do hereby declare that the following is a full, clear, and exact description of the same, reference being had to the accompanying drawings, making a part of this specification, in which—

Figure 1 is a longitudinal vertical section of a locomotive fire-box with my invention applied; Fig. 2, a transverse vertical section of the same; Fig. 3, a plan of the invention of the same; Fig. 4, a transverse section of one of the elliptic bars.

Similar letters of reference indicate corresponding parts in the several figures.

This invention consists in the employment or use, for the grate of a boiler-furnace, of a series of tubular bars of elliptical or substantially similar form in their transverse section, and arranged as hereinafter shown and described, and using in combination with said bars a series of alternately-interposed tubular or solid bars of round form, the elliptical bars being so much deeper than the round ones as to expose a great portion of the surface to lateral contact with the incandescent fuel upon the grate, and cause the rapid generation of steam from the water which circulates through them between the water-spaces at opposite ends of the fire-box.

The invention also consists in the arrangement within and at the sides and ends of the fire-box of bent pipes having an elliptical or flattened transverse section, connected each at one end with the upper part of the water-space surrounding the fire-box, and at the other end with a lower portion of said water-space, such pipes being exposed to the intense radiant heat of the fire and to the contact of the heated and inflamed gases of combustion, and having induced through them a natural circulation of water, which is rapidly converted into steam.

To enable those skilled in the art to make and use my invention, I will proceed to describe its construction and operation.

A is the fire-box, B B are the elliptical tubular grate-bars, and C C the interposed round bars, also represented of tubular construction, all of said bars communicating with the water-spaces at the front and back of the fire-box. The elliptical bars B B are set up edgewise—that is to say, with the greater diameter in a vertical direction, and this diameter is so much greater than that of the interposed round bars C C that though all are arranged with their bottoms about on the same level, the said bars B B stand high above C C, with the greater or a very considerable portion of their surfaces in contact with the fuel which enters the spaces between them and above C C; and by the use of this system of elliptical and interposed round bars a greater area of surface is exposed in lateral contact with the fire than is done by the zigzag arrangement of round bars lately introduced.

D D are the bent pipes arranged at the sides and ends of the fire-box. These pipes are straight for the greater portion of their length, but have elbows at top and bottom to enable them to be connected with the water-space surrounding the fire-box. Their transverse section is of elliptical or flattened form, and they are arranged with the portion between the elbows either upright or inclined in such a way as to keep the lower parts nearer than the upper parts to the sides and ends of the fire-box. The said pipes being exposed to the radiant heat of the incandescent fuel on the grate and to the contact with the flame and heated gases evolved from the fuel, are subjected to a very great heat, and the water in them is rapidly converted into steam, but at the same time so rapid an upward circulation of water is induced within them as to prevent them from being overheated.

E E are horizontal pipes arranged parallel with the sides of the fire-box and connecting the pipes D with each and with the water-space at the ends of the fire-box. These pipes also serve as heating-surfaces, in contact with which a rapid generation of steam takes place, and at the same time they aid the circulation in D D.

Similar pipes to E E may be employed to connect the pipes D D at the ends of the fire-box with each other and with the water-spaces at the sides of the fire-box.

I would remark that the tubes B may be cast with the fire-box all in one piece, or they may be made separately from it and attached in any proper way.

I do not claim, broadly, a tubular fire-grate; but,

Having thus described my invention, what I claim as new, and desire to secure by Letters Patent, is—

1. The employment or use of a series of elliptical tubes, B, fitted in the fire-box A, when said tubes are made to communicate with the water-space at the ends of the fire-box, substantially as herein set forth.

2. Having the fire-grate made with an alternate arrangement of large elliptical tubes and small cylindrical tubes or bars, in the manner and for the purpose herein shown and described.

3. The arrangement of the elliptical pipes D and connecting-pipes E with each and with the water-space, as herein shown and described.

JOSEPH P. EVANS.

Witnesses:
JAMES JAMES,
WILLIAM W. JAMES.